June 24, 1958 H. COOLEY 2,840,659
MOTION PICTURE ELECTRIC CIRCUIT CONTROL APPARATUS
Filed Dec. 21, 1954
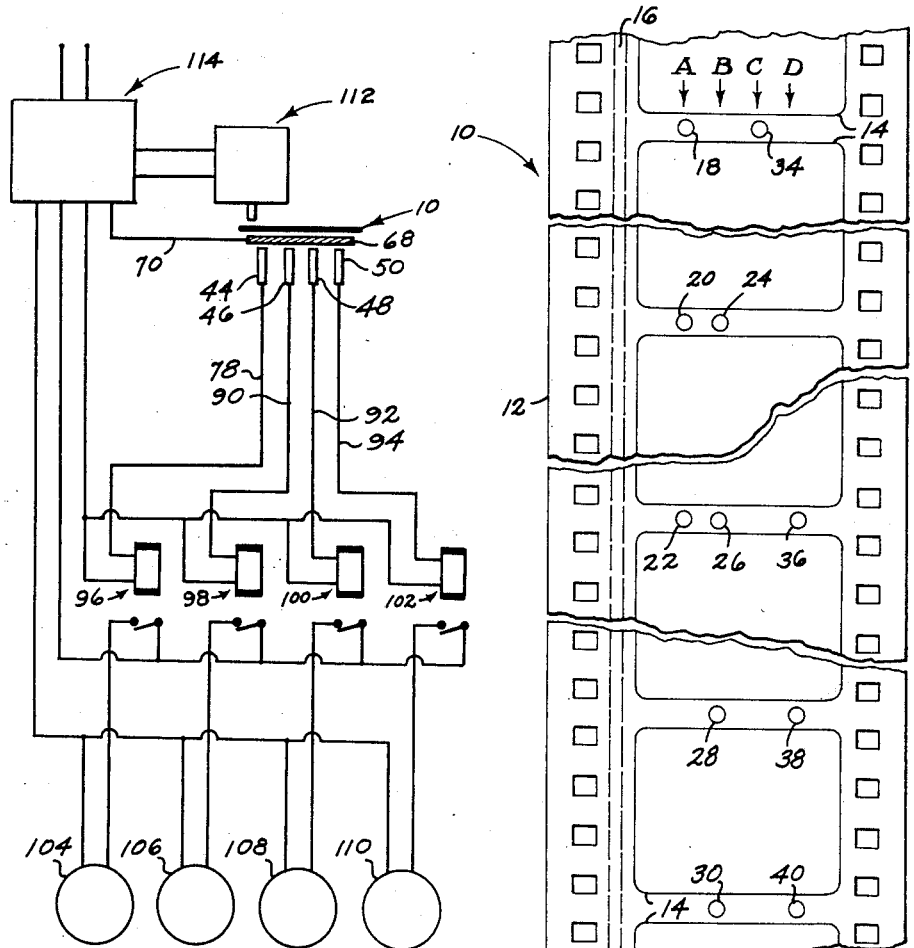
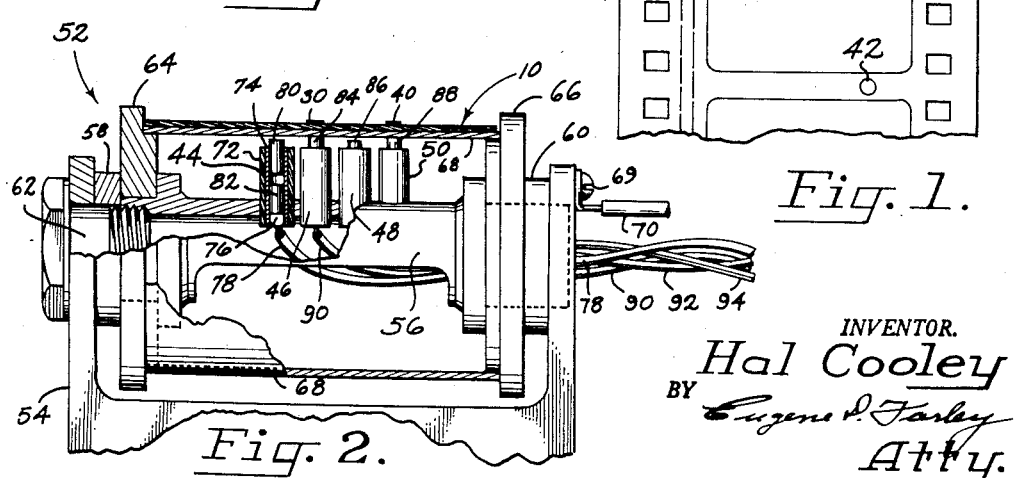
INVENTOR.
Hal Cooley
BY Eugene D. Farley
Atty.

United States Patent Office 2,840,659
Patented June 24, 1958

2,840,659

MOTION PICTURE ELECTRIC CIRCUIT CONTROL APPARATUS

Hal Cooley, Portland, Oreg., assignor to Wendell L. Thompson, Prattville, Ala.

Application December 21, 1954, Serial No. 476,717

4 Claims. (Cl. 200—87)

This invention relates to electric circuit control apparatus for use in conjunction with motion picture projectors and the like.

With the advent of stereophonic sound and other improvements in motion pictures it has become increasingly a problem to provide space on the film for control of the improvements without encroaching upon the space required for the picture. Since camera and projector dimensions are standardized, it will be apparent that any effort to put additional control tracks along one or both edges of the film necessarily must diminish correspondingly the intermediate space available for the frames carrying the pictures. Accordingly it is the general object of this invention to provide a means for overcoming this difficulty and for utilizing the space between the frames of the film for achieving the desired and necessary control of the electric circuits associated with the motion picture projector.

It is another object of this invention to provide apparatus for controlling one or a plurality of electric circuits in motion picture projection apparatus synchronously with the audio and video portions of the film.

It is another object of this invention to provide apparatus for controlling the spaced apart speakers used behind cinemascope screens for achieving realistic directional sound effects through the use of actuating elements mounted on the film between the frames, rather than alongside the same.

It is still another object of this invention to provide electric circuit control apparatus for operating a selected one or all of the electric circuits associated with a motion picture projector and like machines through or adjacent to which strip material is passed.

It is a further object of this invention to provide electric circuit control apparatus for controlling the circuits of motion picture projectors without requiring elaborate auxiliary installations or extensive modification of conventional projectors.

The manner in which the foregoing and other objects of this invention are accomplished will be apparent from the accompanying specification and claims considered together with the drawings wherein like numbers represent like parts and wherein:

Figure 1 is a fragmentary plan view of a motion picture film designed for use in combination with the presently described circuit control apparatus;

Figure 2 is a view in side elevation, partly in section, illustrating an electric switch employed together with the film of Figure 1 in the presently described electric circuit control apparatus; and Figure 3 is a schematic circuit diagram illustrating a typical application of the electric circuit control apparatus of this invention.

Generally stated, the electric circuit control apparatus of this invention comprises the combination of a novel film, a novel electric switch and associated time delay relay means for use with the film in motion picture projectors and the like, and a plurality of electric devices to be operated. The film 10 may be of conventional dimensions and includes the base 12 coated with a light-sensitive emulsion and having printed thereon a plurality of frames of pictures 14 spaced apart from each other by the usual distance. A sound track 16 also may be included, running longitudinally of the film alongside the frames. The sound track may be recorded on the film by any desired technique, optical, magnetic, or otherwise.

Between the frames on the film are one or more series of magnetic elements. The number of such series will correspond to the number of electrical devices to be operated, there being four series in the illustrated embodiment indicated by the letters A, B, C, and D. Each series is comprised of a predetermined number of actuating elements in the spaces between consecutive frames, the elements making up series A being indicated by the numerals 18—22, those comprising series B by the numerals 24—30, that comprising series C being indicated by the numeral 34 and those comprising series D including elements 36—42.

The actuating elements preferably are made of a magnetic material such as steel, although small magnets may be employed if desired. They are fastened on the film between the frames in any desired manner as by gluing them on, impressing them into the film, or printing them thereon. In the alternative, rather than using solid strips or pieces of metal, a powdered metal in combination with a suitable binder may be applied in areas corresponding to those indicated by numerals 18—42. However applied and whatever their constitution, the actuating elements in each series are arranged between consecutive frames in substantial alignment with each other so that as they pass over the other elements of the apparatus such elements may be arranged in stations spaced apart corresponding to the spacing of the series of actuating elements.

Actuating elements 18—42 are employed to control circuits in motion picture projectors and similar apparatus by passing film 10 over or adjacent a plurality of electric switches, there being one switch for each series of elements, and the switches being spaced apart distances corresponding to the distances between the series of elements on the film. Thus in the presently illustrated embodiment where there are four series of actuating elements there are four switches indicated at 44—50 in Figure 3. These necessarily must occupy a small space and preferably are constructed in accordance with the principle illustrated in my copending application for United States Letters Patent, Serial No. 464,527, filed October 25, 1954, for Magnetc Switch, which matured into Patent No. 2,804,518 on August 27, 1957.

The construction of the preferred switches and their manner of installation are illustrated in Figure 2. The switches preferably are housed in guide means for the film which advantageously may comprise an idler roller indicated generally at 52. This roller may constitute one of the rollers normally employed in a motion picture projector for guiding the film therethrough. It is rotatably mounted between supporting arms on a frame member 54.

Shaft 56 is spaced apart from the supporting arms by washers 58, 60. It has a threaded outer end for engagement with locking screw 62 and carries the two spaced apart end pieces 64, 66 which in turn support the cylinder 68. The latter, as well as frame 54, shaft 56, and at least one of end pieces 64, 66 are made of electrically conducting material. Accordingly post 69 with electrical connection 70 may be mounted on the frame.

Side pieces 64, 66 and cylinder 68 thus comprise a roller which rotates with the movement of film 10 about shaft 56, which is fixed. Mounted on the shaft are the plurality of switches 44—50 indicated hereinabove. Any suitable manner of mounting may be employed, a convenient means being the provision of spaced apart openings into the interior of shaft 56 through which the bodies of the switches extend.

The construction of each switch is indicated in Figure 2. It comprises an outer casing 72 of insulating material within which is a liner 74 of electrically conducting material. An electric contact element 76 to which is connected the lead wire 78 is placed firmly in contact with the liner.

Within liner 74 is supported a floating magnet 80. To increase the sensitivity of the switch, magnet 80 is supported by the opposed magnetic field of another magnet 82. These two magnets are so arranged that magnet 80 will float with its end projecting from liner 74, but normally out of contact with the inner surface of the roller element 68. The body of the magnet is made of an electrically conducting material and accordingly a circuit may be completed through wire 78, contact element 76, liner 74, magnet 80, cylinder 68, side pieces 64, 66, shaft 56, and wire 70 in the event that magnet 80 is so actuated as to bridge the space separating it from cylinder 68.

The other switch units 46—50 may be constructed similarly, each being provided with a floating, electrically conducting magnet, 84, 86, 88, respectively, and with electrical connection 90, 92, 94 respectively.

It will be apparent from a consideration of Figure 2 that as film 10 is passed over roller assembly 52, series A, B, C, and D of the actuating elements on the film will be in substantial registry with magnets 80—88 within the roller. For example when elements 30 and 40 in series B and D respectively pass over the corresponding switches, i. e. switches 46 and 50 respectively, the magnets of the latter will be attracted by the actuating elements and will be extended from the casings in which they are housed to such an extent that they will contact the inner surface of cylinder 68. This will complete electric circuits in the manner indicated above.

However, in the absence of suitable provision for holding it open, the circuit will be completed only momentarily because as soon as the actuating elements have traversed the roller, which requires but a fraction of a second, the magnets in the switches will no longer be held in position but will drop downwardly until they are attracted by the passage of other actuating elements. Means are provided however for holding the circuit closed during this interval.

As is apparent from Figure 3 such means comprise a plurality of time delay relays 96—102, one such relay being associated with each of switches 44—50. These are set to hold the switches closed during the brief interval that the frames between the actuating elements are traversing the switches. Accordingly a continuous flow of current is maintained through the circuits during the time series A, B, C, or D of the actuating elements are passing over roller 52.

The circuits thus completed may be employed to operate any suitable electrical equipment. They may be advantageously used, for example, to operate a plurality of speakers 104—110 stationed at intervals behind a cinemascope screen. This makes possible obtaining the desired directional effect and duration of the sound, since one or more of the speakers may be energized depending upon the location and length of the series of actuating elements on the film.

In the foregoing application, the switches 44—50, relays 96—102 and speakers 104—110 are associated in the electric circuit with a sound control head 112 which scans sound track 16 in conventional manner and establishes electric circuits to the speakers through a system of suitably interconnected transformers, voltage and power amplifiers, etc. arranged in conventional manner and indicated generally at 114. Accordingly one or more of speakers 104—110 may be operated depending upon which of switches 44—50 is closed by the magnetic elements on the film.

Operation

The manner of operation of the herein described motion picture electric circuit control apparatus is as follows.

A conventional sound film 10 with sound track 16 and frames 14 is edited after developing, the purpose of the editing being to attach, impress, or imprint series of actuating elements A, B, C, or D corresponding to the location of the speakers it is desired to actuate. Since in the preferred instance the actuating elements comprise magnetic elements, the film may be provided originally with complete series of such elements continuously from one end to the other. The editing operation then may comprise passing the film frame by frame through an editing machine which accomplishes the magnetizing (or demagnetizing) of selected ones of the actuating elements. This in effect will produce the sequential series of such elements desired.

The film then is passed over an idler roller of a motion picture projector which serves as a housing for a plurality of switches 44—50 corresponding in station to the spacing between series A, B, C, and D of the actuating elements. Selected ones of these switches are operated as the actuating elements pass over them, the circuit being held by operation of suitably set time delay relays 96—102, one of which is associated with each of the switches. This in turn operates selected ones of speakers 104—110 during the intervals that the actuating member series are passing over the switches, to produce the desired stereophonic or directional sound effect.

It is to be understood that the form of my invention herewith shown and described, is to be taken as a preferred example of the same, and that various changes in the shape, size and arrangement of parts may be resorted to, without departing from the spirit of my invention or the scope of the subjoined claims.

Having thus described my invention I claim:

1. An electric switch adapted to be operated by a magnetic element carried by a movable strip of electrically non-conducting non-magnetic material, said switch comprising a frame, a hollow electrically conducting guide roller mounted on the frame and adapted to guide a movable strip over its outer surface, an electrically conducting magnet, electrically non-conducting support means within the roller arranged to support the magnet for movement substantially radially with respect to the roller, the magnet being normally spaced from the inner surface of the roller and being movable into contact with the inner surface of the roller upon attraction thereof by a magnetic element on a movable strip being guided over the outer surface of the roller, and conductor means connecting the roller and magnet in series in an electric circuit.

2. An electric switch adapted to be operated by a magnetic element carried by a movable strip of electrically non-conducting non-magnetic material, said switch comprising a frame, a hollow electrically conducting guide roller mounted for rotation on the frame and adapted to guide a movable strip over its outer surface, a support secured to the frame and extending into the roller, a magnet housing within the roller mounted upon the support and having an elongated bore therein extending substantially radially toward the roller, an electrically conducting magnet mounted slidably within the housing bore and normally spaced from the inner surface of the roller, the magnet being movable into contact with the inner surface of the roller upon attraction thereof by a magnetic element on a movable strip being guided over the outer surface of the roller, and conductor means connecting the roller and magnet in series in an electric circuit.

3. An electric switch adapted to be operated by a magnetic element carried by a movable strip of non-conducting non-magnetic material, said switch comprising an electrically conducting frame, a hollow electrically conducting guide roller mounted for rotation on the frame and adapted to guide a movable strip over the outer surface, an electrically conducting support secured to the frame and extending into the roller, an electrically conducting magnet housing within the roller mounted upon but electrically insulated from the support and having an elongated bore therein extending substantially radially toward the roller, an electrically conducting magnet mounted slidably within the housing bore and normally spaced from the inner surface of the roller, the magnet being movable into contact with the inner surface of the roller upon attraction thereof by a magnetic element on a movable strip being guided over the outer surface of the roller, and conductor means connecting the roller and magnet in series in an electric circuit.

4. For use in motion picture electric control apparatus, which apparatus includes a movable film strip having a plurality of spaced apart frames and a plurality of substantially aligned magnetic elements mounted on the strip between a predetermined number of consecutive frames, the apparatus also including an electrical device to be operated in accordance with the positions of the magnetic elements on the strip and an electric circuit for said electrical device: an electric switch comprising a frame, a hollow electrically conducting guide roller mounted for rotation on the frame and adapted to guide the movable strip over its outer surface, an electrically conducting magnet, electrically non-conducting support means within the roller arranged to support the magnet for movement substantially radially with respect to the roller, the magnet being normally spaced from the inner surface of the roller and being movable into contact with the inner surface of the roller upon attraction thereof by a magnetic element on the movable strip being guided over the outer surface of the roller, and conductor means connecting the roller and magnet in series in the electric circuit of the electrical device.

References Cited in the file of this patent

UNITED STATES PATENTS

| | | |
|---|---|---|
| 1,254,436 | Rogers | Jan. 22, 1918 |
| 1,793,772 | Bouma | Feb. 24, 1931 |
| 1,909,765 | Jenkins | May 16, 1933 |
| 1,929,518 | Ross | Oct. 10, 1933 |
| 1,953,538 | Mittell | Apr. 3, 1934 |
| 2,473,468 | Cooley | June 14, 1949 |
| 2,650,962 | Sinclaire | Sept. 1, 1953 |
| 2,674,009 | Williams | Apr. 6, 1954 |
| 2,769,873 | Noregaard | Nov. 6, 1956 |

FOREIGN PATENTS

| | | |
|---|---|---|
| 336,786 | Great Britain | Oct. 23, 1930 |
| 602,035 | Great Britain | May 19, 1948 |